(12) United States Patent
Toyoda et al.

(10) Patent No.: US 8,284,640 B2
(45) Date of Patent: Oct. 9, 2012

(54) OPTICAL PICKUP

(75) Inventors: Hiroyuki Toyoda, Hitachinaka (JP); Takehiro Hayama, Fujisawa (JO); Junichi Senga, Yokohama (JP); Hitoshi Matsushima, Ryugasaki (JP); Takayuki Fujimoto, Tsuchiura (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 100 days.

(21) Appl. No.: 12/414,718

(22) Filed: Mar. 31, 2009

(65) Prior Publication Data

US 2009/0268587 A1 Oct. 29, 2009

(30) Foreign Application Priority Data

Apr. 28, 2008 (JP) .................................. 2008-116571

(51) Int. Cl.
*G11B 7/00* (2006.01)
(52) U.S. Cl. ...................... 369/44.15; 720/679; 720/682
(58) Field of Classification Search .......................... None
See application file for complete search history.

(56) References Cited

U.S. PATENT DOCUMENTS

| | | | | |
|---|---|---|---|---|
| 4,769,806 A | * | 9/1988 | Takamori | 369/292 |
| 5,727,009 A | * | 3/1998 | Tajiri et al. | 372/50.11 |
| 7,420,891 B2 | * | 9/2008 | Ochi et al. | 369/44.15 |
| 2003/0099174 A1 | * | 5/2003 | Ota et al. | 369/47.51 |
| 2004/0095872 A1 | * | 5/2004 | Miyashige | 369/112.23 |
| 2005/0025030 A1 | * | 2/2005 | Nakamura et al. | 369/112.15 |
| 2008/0074962 A1 | | 3/2008 | Toyoda et al. | |

FOREIGN PATENT DOCUMENTS

| | | |
|---|---|---|
| CN | 101154404 | 3/2008 |
| JP | 2001-014712 | 1/2001 |
| JP | 2004-5824 | 1/2004 |
| JP | 2007-193855 | 8/2007 |

OTHER PUBLICATIONS

Office Action issued in Japanese Patent Application No. 2008-116571 on Mar. 15, 2011.

* cited by examiner

*Primary Examiner* — Joseph Feild
*Assistant Examiner* — Parul Gupta
(74) *Attorney, Agent, or Firm* — Antonelli, Terry, Stout & Kraus, LLP.

(57) ABSTRACT

An optical pickup, having an optical pickup housing made of resin, for maintaining the heat radiation performance or capacity of a semiconductor laser, also an objective lens driving mechanism, and further a driver IC for the semiconductor laser, while keeping small-size and light-weight thereof, comprises a pickup housing, in which an optical part and a semiconductor laser are fixed; an objective lens, which is attached within the pickup housing; and an objective lens driving mechanism, which is configured to drive the objective lens, further comprising: a metal-made bottom cover, which is configured to cover a lower surface of the pickup housing and a side surface of an inner periphery of an optical disc, wherein the metal-made bottom cover and the semiconductor laser are thermally connected with each other.

6 Claims, 7 Drawing Sheets

OPTICAL PICKUP

BACKGROUND OF THE INVENTION

The present invention relates to an optical pickup.

An optical pickup, for reading/recording information from/onto an optical disc, is sometimes heated up to high temperature, due to large consumption of electric power within a semiconductor and/or a laser driver circuit. For this reason, it is necessary to increase the heat radiation performance or capacity, in particular, of the semiconductor laser and the laser driver circuit, and such a design is made that the temperature will not exceed a guaranteed temperature of that part(s).

In recent years, because of demands made upon light weighting and/or low costing of the optical pickup, it is desired to manufacture a housing of the optical pickup, conventionally being made from a metal die-cast, of a resin. However, applying the resin, being low in the heat conductivity comparing to the metal, causes a problem of lowering the heat radiation performance or capacity of the semiconductor laser.

With a housing of the optical pickup made of resin, conventionally, the heat radiation performance or capacity for the semiconductor laser is maintained by connecting a metal-made bottom cover with the semiconductor laser, thermally, but a heating value (i.e., an amount of heat generation) of the semiconductor laser also goes up to be large accompanying with an increase of an output of the semiconductor laser; therefore it is in such a situation that sufficient performance or capacity of heat radiation cannot be obtained, by means of such conventional bottom cover.

In the following Patent Document 1, for the purpose of increasing the heat radiation capacity of that bottom cover, there are disclosed a shaft, for supporting the optical pickup to be movable in a radial direction of an optical disc, and also the structures to be thermally connected with an end of the bottom cover.

And the optical pickups can be classified, roughly, into the followings; i.e., a thin-type one, which is suitably applied into an optical disc drive for use in a note-type personal computer, and a large-size one for an optical disc drive, which is mainly applied into a DVD recorder or a desktop personal computer, etc. The thin-type optical pickup has thickness less than 10 mm, mounting a driver equipment or mechanism for an objective lens within an inside of the housing of the optical pickup, and has such the structures that metal members for supporting a magnet can expose into an outside from a bottom cover side; i.e., an opposite side of a surface of the housing of the optical pickup facing to the optical disc.

On the other hand, the large-size optical pickup has thickness equal or greater than 10 mm, mounting the driver mechanism for the objective lens on the surface of the housing of the optical pickup, but facing to the optical disc, and it has such the structures that the metal members for supporting the magnet cannot expose outside into the side of the bottom cover.

In the driver mechanism for the objective lens, the objective lens, on which a coil is attached, is supported in space through elastic forces of wires. Through the wires can run current into the coil, and due to electromagnetic force generated by the coil accompanying with this and that of the magnet, the objective lens is driven. The heat generated in the coil attached on the objective lens can radiate into an air surrounding the coil, but because a gap defined between the magnet and the coil is very small, then almost of the heat transmitting to the air transfers to the magnet, so that it increases the temperature of the magnet.

Within the metal housing of the optical pickup of the conventional art, the heat transmitting to the magnet can run away, further, to the housing of the optical pickup, through the metal member for supporting the magnet. Also, within the optical pickup of the thin-type mentioned above, since the metal member for supporting the magnet is exposing outside from the housing of the optical pickup, and further the space around the pickup is narrow within an inside of the thin-type optical disc drive, then it can receive strongly an influence of winds generated by the rotating optical disc, i.e., being high of the capacity of heat radiation, and therefore it is possible to maintain the sufficient performance or capacity the heat radiation, even if the housing of the optical pickup is not made of metal.

However, the mechanism for driving the objective lens, which can be mounted on the optical pickup of thin-type, is restricted in the sizes thereof because it is the thin-type, and is low in the performance or capacity of heat radiation, comparing to that of the objective lens driving mechanism of the large-size optical pickup. Then, for enabling or dealing with high-speed recording onto the optical disc, it is necessary for a drive to have such a disc motor that can rotates the optical disc at high speed, and also to enable to mount the large-size optical pickup thereon, having a high performance mechanism for driving the objective lens.

However, with the large-size optical pickup, it is difficult for heat in the magnet to run into the housing of the optical pickup made of resin, even through the metal members for supporting the magnet. For this reason, there can be considered a problem of lowering of the performances of the magnet due to an increase of temperature of the magnet, and then there appears a necessity for maintaining the performance or capacity of heat radiation, in particular, for the objective lens driving mechanism.

[Patent Document 1] Japanese Patent Laying-Open No. 2001-14712 (2001)

BRIEF SUMMARY OF THE INVENTION

In order to mount a high output semiconductor laser in a resin-made housing of the optical pickup, it is required to increase the performance or capacity of heat radiation, in particular, of the bottom cover thereof. However, simply enlarging or expanding an area of the bottom cover brings about an increase of cost or weight, and also the large-sizing of the optical pickup, and further an obstruction of freedom of designing, such as, wiring, etc.; therefore, it cannot be said to be preferable or suitable in the structures thereof.

Such structure, i.e., extending or elongating the end of the bottom cover, as is described in the Patent Document 1, so as to bring it to be in contact with the optical disc drive, although it is a useful or significant technology, in particular, from a viewpoint of increasing the performance or capacity of heat radiation, without increasing the area of that bottom cover. However, since the optical pickup is a movable part, as far as possible, there are brought about problems, such as, wear-out of contacting parts, and generation of dusts accompanying with that wear-out, etc., for example.

For dissolving this, it can be considered to bring the contacting pressure to be small, but for that, the heat resistance is increased at the contacting portion between the optical disc drive and the bottom cover, i.e., an increase of performance or capacity of heat radiation comes to be very small.

Also, with the large-size optical pickup, since conventionally, the housing of the optical pickup is made of a metal, therefore the performance or capacity can be maintained, sufficiently, for the heat radiation of the objective lens driving mechanism, but because of change in the material of the housing of the optical pickup, such as, from the metal into the resin, it is hard for the heat to transmit from the member for supporting the magnet into the housing of the optical pickup; i.e., it is difficult to maintain the performance or capacity of heat radiation.

An object according to the present invention is to provide an optical pickup for enabling to maintain the performance or capacity of heat radiation for the semiconductor laser and for the lens driving mechanisms.

For accomplishing the object mentioned above, according to the present invention, there is provided an optical pickup, comprising: a pickup housing, in which an optical part and a semiconductor laser are fixed; an objective lens, which is attached within said pickup housing; and an objective lens driving mechanism, which is configured to drive said objective lens, further comprising: a metal-made bottom cover, which is configured to cover a lower surface of said pickup housing and a side surface of an inner periphery of an optical disc, wherein said metal-made bottom cover and said semiconductor laser are thermally connected with each other.

Also, the object mentioned above is accomplished by the optical pickup, as is described in the above, wherein a portion of said bottom cover covering the surface of the inner periphery side of the optical disc of said pickup housing and a magnet supporting metal member of said objective lens driving mechanism are thermally connected with each other.

Also, the object mentioned above is accomplished by the optical pickup, as is described in the above, wherein an opening is provided on the surface on the inner periphery side of the optical disc of said metal-made bottom cover.

Also, the object mentioned above is accomplished by the optical pickup, as is described in the above, wherein said semiconductor laser and said objective lens driving mechanism are thermally connected with said metal-made bottom cover.

Also, the object mentioned above is accomplished by the optical pickup, as is described in the above, wherein a laser driver IC and said objective lens driving mechanism are thermally connected with each other.

According to the present invention, it is possible to provide an optical pickup for enabling to maintain the heat radiation performance or capacity of the semiconductor laser and the lens driving mechanism therein.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENT(S)

Hereinafter, embodiments according to the present invention will be fully explained by referring to the attached drawings.

Embodiment 1

Figure 1:
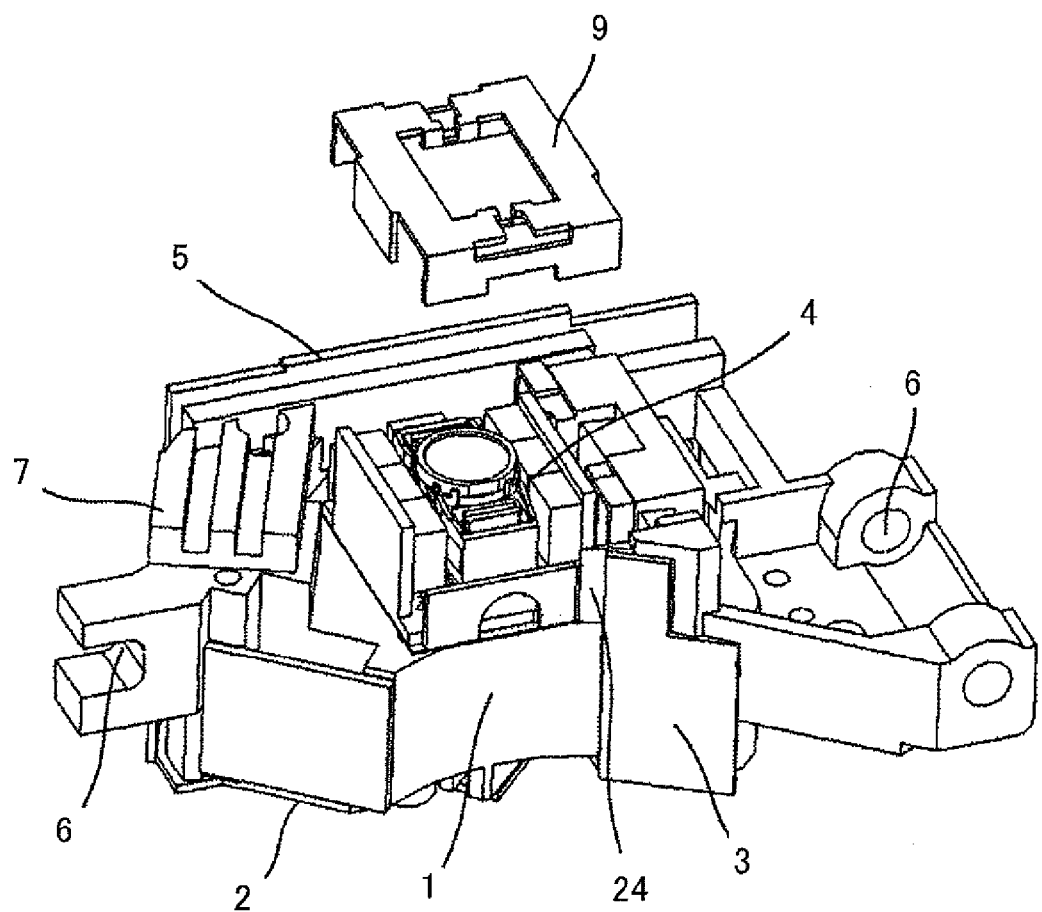
FIG. 1 is a perspective view of an optical pickup equipped with an embodiment 1 according to the present invention.

FIG. 1 is a perspective view of an optical pickup equipped with an embodiment 1 according to the present invention.

By the way, as was mentioned in the background arts in the above, the optical pickups can be classified, roughly, into the followings; i.e., a thin-type one, which is suitably applied into an optical disc drive for use of a note-type personal computer, and a large-size for an optical disc drive, which is mainly applied into a DVD recorder or a desktop personal computer.

The optical pickup shown in FIG. 1, which will be described according to the present embodiment, is that of the large-size. Also, in recent years, for the purposes of light-weighting of the optical pickup and/or cost reduction thereof, it is requested to manufacture a housing 1 of the optical pickup from a resin, and in the present embodiment is applied the optical pickup housing 1 made of resin, thereby providing an optical pickup of light-weight and low-cost, while maintaining a high reliability.

The housing 1 of the optical pickup is a housing for fixing optical parts and a semiconductor laser, etc., therein, and as is shown in FIG. 1, it has bearing portions 6 on both sides (i.e., the left-hand side and the right-hand side) thereof. Those bearing portions 6 are supported on shafts (which will be explained by referring to FIG. 2). A reference numeral 2 depicts a bottom cover. This bottom cover is made from a metal plate, and it is attached on a lower side of the optical pickup. A reference numeral 3 depicts a bent portion of the bottom cover 2. A reference numeral 4 depicts an objective lens driving mechanism. A reference numeral 5 depicts a printed circuit board. A reference numeral 7 depicts a heat radiation fin. A reference numeral 9 shows a cover of the objective lens driving mechanism. A reference numeral 24 depicts heat conductive grease. This grease 24 is put between the bottom cover 2 and a magnet supporting metal member 15, so as to connect them thermally.

Figure 2:
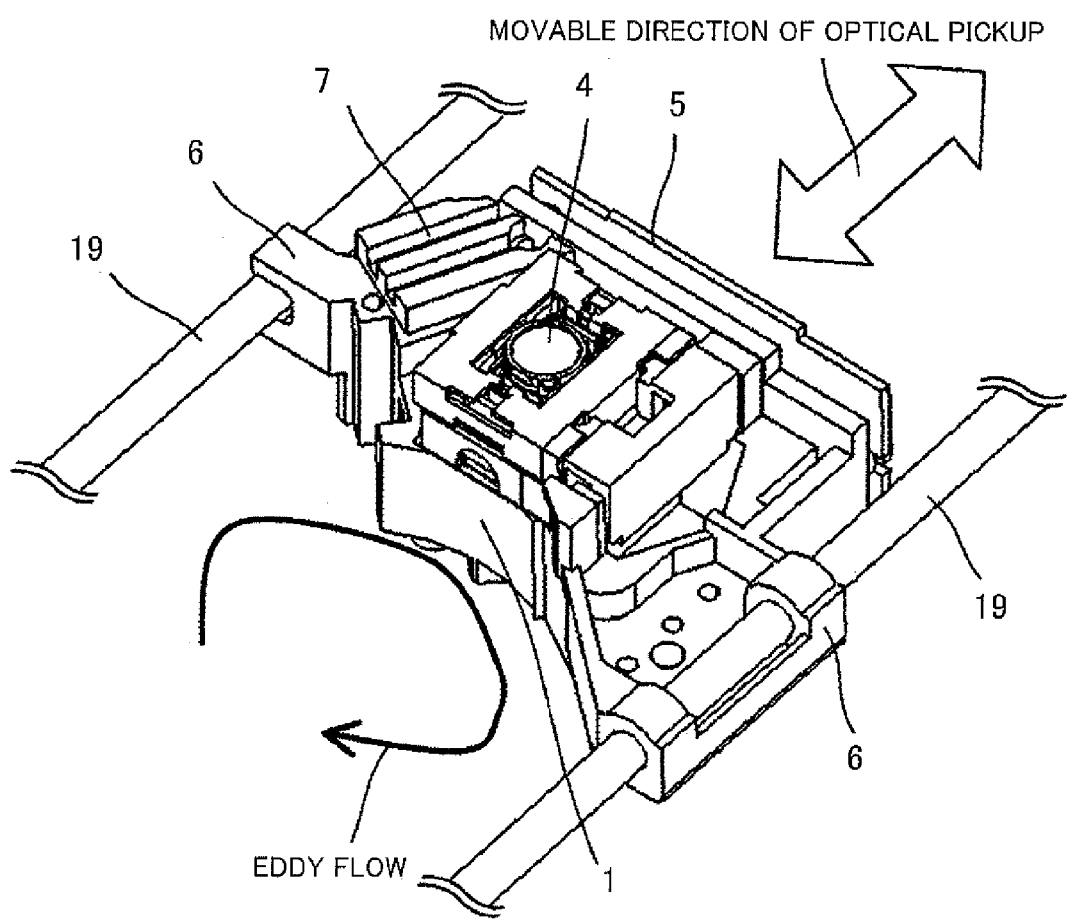
FIG. 2 is a perspective view for showing the structures for fixing the optical pickup according to the present invention.

FIG. 2 is a perspective view for showing the optical pickup in the condition of being mounted on a drive.

In this FIG. 2, the optical pickup is attached, being supported at the bearing portions 6 thereof on the shafts 19 of the optical disc drive. With this, the optical pickup can move along the shafts 19.

Figure 3:
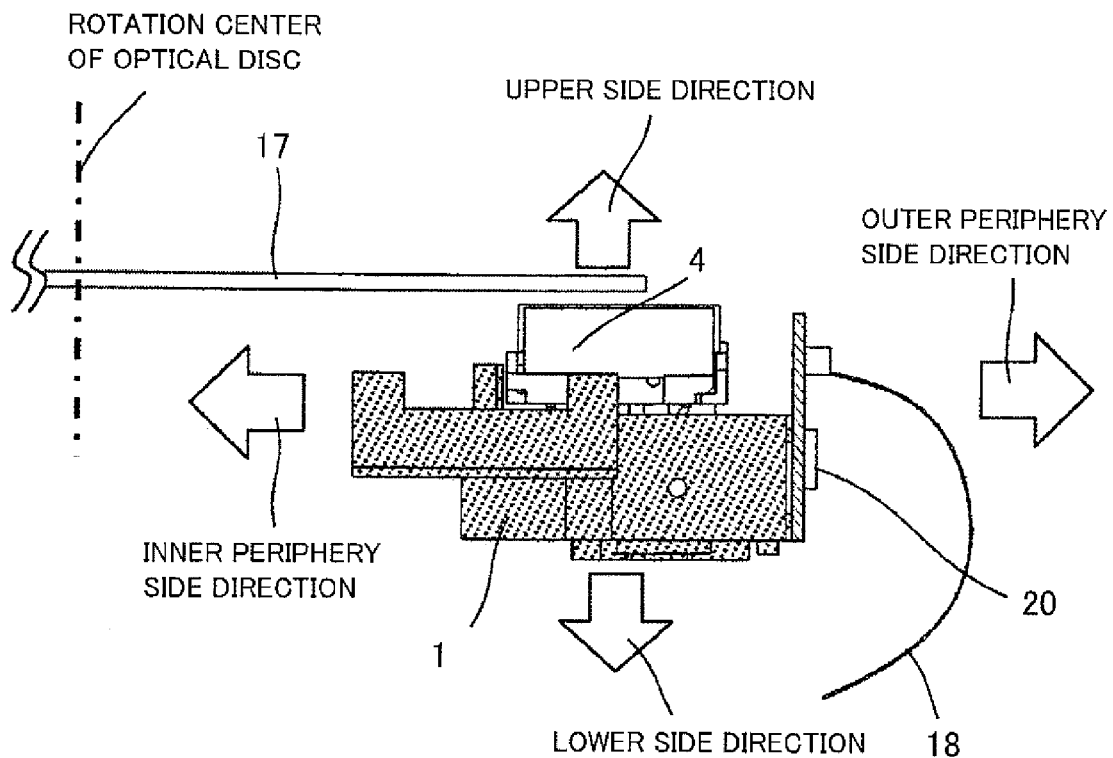
FIG. 3 is a side view for showing the positional relationships between an optical disc and the optical pickup according to the present invention.

FIG. 3 is a side view for showing the positional relationship between an optical disc 17 and the optical pickup.

In this FIG. 3, the optical disc 17 is accessible in a radial direction thereof; i.e., from an inner periphery, a center side of rotation thereof, to an outer periphery, the opposite side thereof. Herein, as is shown in FIG. 3, it is assumed that a side of the optical pickup, directing to an inner periphery of the optical disc, is called by an "inner periphery side" while calling the surface, directing an outer periphery, by an "outer periphery side", and also a side, in perpendicular direction to the optical disc surface, on which the optical disc 17 is put on when the optical pickup is attached on the optical disc drive, is called by an "upper side" while calling the side opposite to the upper side by an "lower side". As is shown in FIG. 3, within the large-size optical pickup, since the objective lens driving mechanism 4 is disposed on an upper side surface of the optical pickup housing 1, since it condenses the lights of the semiconductor laser upon a surface of the optical disc by means of the objective lens. A reference numeral 18 depicts a flexible wiring. A reference numeral 20 depicts a laser driver IC.

Figure 4:
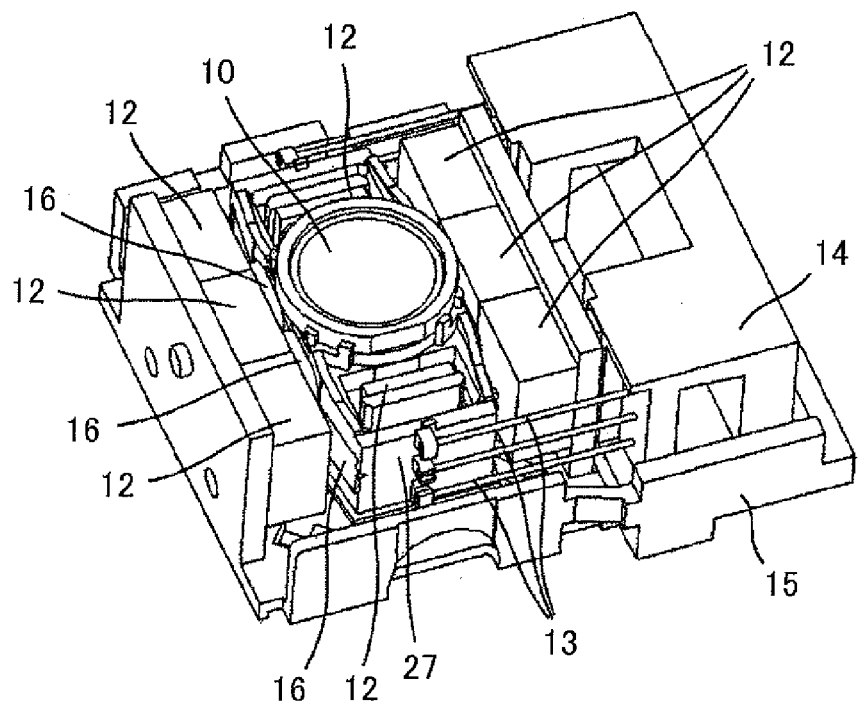
FIG. 4 is a perspective view for showing an objective lens driving mechanism according to the present invention.

FIG. 4 is a perspective view of an objective lens driving mechanism, equipped with the present embodiment therein.

In this FIG. 4, an objective lens 10 is attached on a light-weighted objective lens holder 27 made of resin, and on this objective lens holder 27 are attached coils 16. Suspension wires 13 are fixed on a suspension holder 14, and the objective lens 10 and the coils 16 are supported in a space, together with the objective lens holder 27, by means of the suspension wires 13. Around this coil 16 is disposed a magnet 12, i.e., at a close range from the coil 16, and supplying current into the coil 16 through the suspension wires 13 generates electromagnetic force to drive the objective lens. The magnet 12 is attached on a metal member for supporting a magnet. This magnet supporting metal member 15, also functioning as a magnetic path, is made of iron, in many cases, and is high in the heat conductivity thereof.

A heat generation source of this objective lens driving mechanism is the coil. The heat of this coil is radiated, basically, into an air surrounding the coil. However, since the distance between the magnet 12 and the coil 16 is near, then almost of the heat radiating into the air transfers to the magnet 12, therefore the temperature of the magnet 12 goes up. The heat transferring into the magnet 12 transmits to the magnet supporting metal member 15. Since the magnet supporting metal member 15 is provided on an upper side of the optical pickup housing 1, with the conventional optical pickup made of metal, the heat in the magnet supporting metal member 15 runs into the optical pickup housing 1, and therefore an increase of temperature of the magnet supporting metal member 15 can be suppressed to be small.

However, with the optical pickup housing 1 made of resin, transmission of the heat from the magnet supporting metal member 15 to the optical pickup housing 1 is weak, and therefore the increase of temperature of the magnet supporting metal member 15 comes to be large. Accompanying this, the temperature of the magnet 12 and further the temperature of the coil 16 go up.

The magnet 12 lowers the magnetic performances thereof, when the temperature goes up to be equal or greater than a guarantee temperature, and there can be considered a lowering of performances of the objective lens 10, as well as, that the coil 16 itself burns off, when the temperature of the coil 16 goes up too high. Then, with the large-size optical pickup applying the optical pickup housing 1 made of resin, it is important to maintain the capacity or performance of heat radiation for this objective lens driving mechanism.

Figure 5:
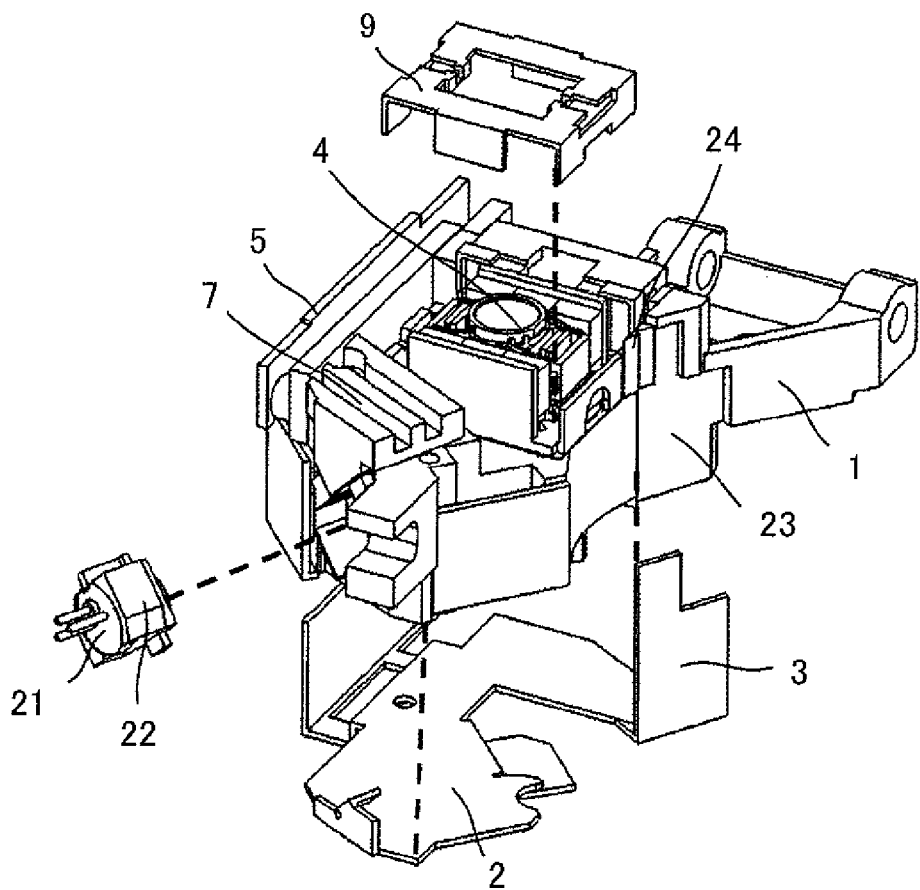
FIG. 5 is an exploded perspective view of the optical pickup equipped with the embodiment 1 according to the present invention.

FIG. 5 is an exploded perspective view of the present embodiment.

In this FIG. 5, a semiconductor laser 21 is attached within the optical pickup housing 1, under the condition of being received within a semiconductor laser holder 22. On a lower side of the optical pickup is attached the bottom cover 2, which is made from a metal plate. Within the conventional optical pickup housing 1 made of metal, the heat of the semiconductor laser transmits to the optical pickup housing 1 via the semiconductor laser holder, and is radiated by means of this optical pickup housing 1 having a large volume.

However, with the optical pickup housing 1 made of resin, the heat radiation performance or capacity is lowered, remarkably. Then, as is shown in the present embodiment, the bottom cover 2 and a heat radiation fin 7 are provided, separately, so as to thermally connect with the semiconductor laser holder 21, and thereby increasing the heat radiation performance or capacity for the semiconductor laser 21. However, for the optical disc drive, such as, a CD and a DVD, for example, the high-speed recording is required, and the semiconductor laser is in a trend of increasing an output thereof. The semiconductor laser 21 has a tendency that the heat generation is large as an output thereof becomes high, then there can be consider a situation that the heat radiation performance or capacity is insufficient when applying the semiconductor laser 21 of the high output.

However, since the optical pickup is demanded to be small in the sizes and light in the weight thereof, there are cases where it is difficult to enlarge the heat radiation fin 7, for example, from a viewpoint of designing thereof. In the similar manner, there are also cases where it is difficult to enlarge the area thereof, in particular, with the bottom cover 2. For the purpose of maintaining the heat radiation performance or capacity while keeping the area of the bottom cover, it can be considered to dispose the bottom cover 2 at a position of high heat radiation performance or capacity. As such the position of high heat radiation performance or capacity, the surface opposing to the optical disc is optimal, but this is difficult from a viewpoint of the structures.

Then, as a result of observation upon a flow of wind around this optical pickup, through a PIV (Particle Image Velocimetry), it can be confirmed that such an eddy flow is generated in an inner periphery side of the optical pickup housing, as is shown by an arrow in FIG. 2, and it can be seen that the heat radiation performance or capacity at that position is higher than that of the lower side of the optical pickup. Then, the bottom cover 2 is extended and folded down, so as to be disposed upon an inner periphery surface of this optical pickup, thereby making a development of structures for obtaining high performance or capacity of heat radiation even with the same surface area.

The optical pickup accesses the optical disc from the inner periphery to the outer periphery thereof, but at the time when it moves to the innermost periphery, there is a necessity of avoiding the structural interference between a disc motor for rotating the optical disc. Then, the inner periphery surface of the optical pickup housing 1 is made from a curved surface so as to avoid that disc motor. This must be considered, also when disposing the bottom cover 2 inside, according to the present embodiment, the inner periphery surface of the optical pickup housing 1 is cut off, so that the bottom cover 2 does not jump out from the inner periphery surface of the optical pickup housing 1.

Although mentioning was made upon the importance of the increasing the performance or capacity of heat radiation of the objective lens driving mechanism 4, previously, however by elongating the bottom cover 2, which is hold down and extended into the inner periphery surface of the optical pickup housing 1 in FIG. 1, further to an upper side, it is possible to bring the bottom cover 2 to be close to the objective lens driving mechanism 4. With this, it is possible to connect this bottom cover 2 and the magnet supporting metal member 15m thermally, through the heat conductive grease 24.

The bottom cover 2 is attached in a stage near to a final step of assembling steps of the optical pickup. For this reason, as is shown in the exploded view of FIG. 5, in many cases, attachment thereof is made flow a lower side of the optical pickup. Accordingly, with the conventional structures thereof, it is difficult to join the objective lens driving mechanism 4 and the bottom cover 2, thermally.

With a bent portion 3 of the bottom cover, according to the present embodiment, it is possible to radiate the heats of the semiconductor laser 21 and the objective lens driving mechanism 4, simultaneously, by means of the bottom cover 2, thereby enabling to lessen the number of the heat radiation members.

Embodiment 2

Figure 6:
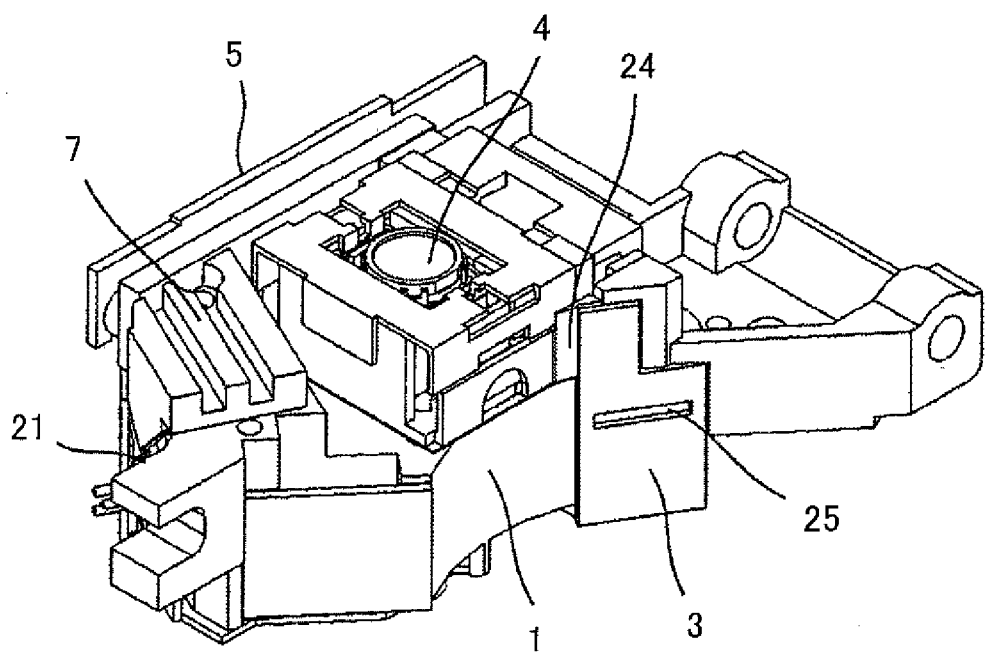
FIG. 6 is a perspective view of the optical pickup equipped with an embodiment 2 according to the present invention.

FIG. 6 is a perspective view for showing the configuration of an embodiment 2.

In the embodiment 1, mentioning was made on the structures for radiating heats of the semiconductor laser and the objective lens driving mechanism, simultaneously, by folding down the bottom cover to elongate and also thermally connecting it with the magnet supporting metal member of the objective lens driving mechanism. However, with such structures, there can be considered a case where the temperature of the objective lens mechanism goes up due to the heat of the semiconductor laser or a case opposite to that, but depending upon a balance between the heating values (i.e., an amount of heat generation) of the semiconductor laser and the objective lens driving mechanism.

Then, according to the present embodiment shown in FIG. 6, a slit 25 is provided on the bent portion 3 of the bottom cover, and an air layer, very low in the heat conductivity thereof, is put between them on the way thereof, thereby obtaining the structures for escaping from the thermal interferences of each other. With this, it is possible not only to suppress the thermal interferences between the semiconductor laser 21 and the objective lens driving mechanism 4, but also to radiate the heats for both of them on the inner periphery surface of the optical pickup having high performance or capacity of heat radiation. This slit 25 can be substituted by a structure, as far as it obstruct the heat conductivity of the metal plate, and similar effects can be obtained, such as, by providing a continuous opening so as to divide the bent portion 3 of the bottom cover into two (2), or by filling up the slit or the opening with a resin in the place of the air, etc., for example.

Embodiment 3

Figure 7:
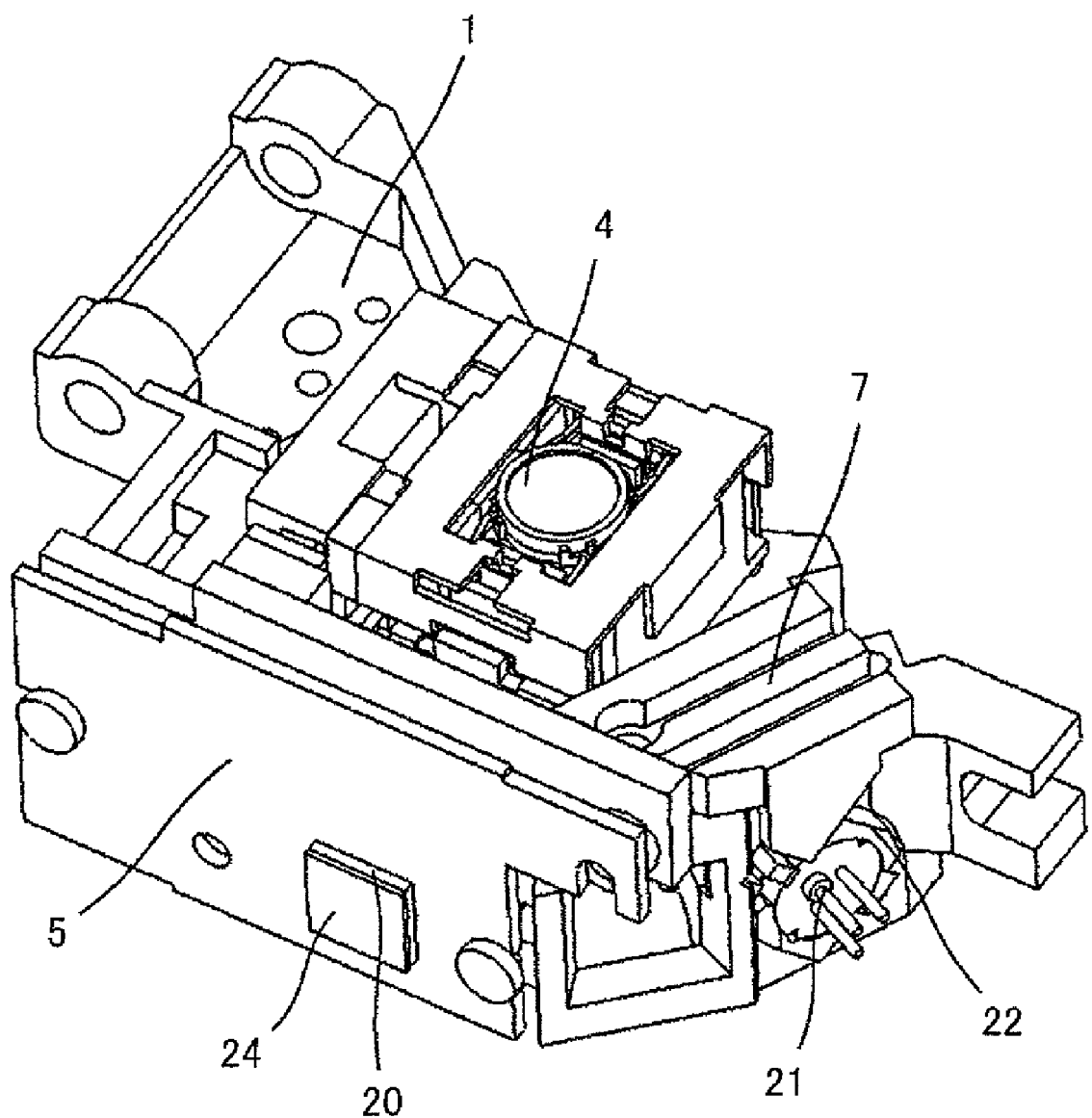
FIG. 7 is a perspective view for showing the position of an IC for driving a semiconductor laser.

FIG. 7 is a perspective view of the optical pickup, for showing the position attaching a laser driver IC, according to a third embodiment.

Figure 8:
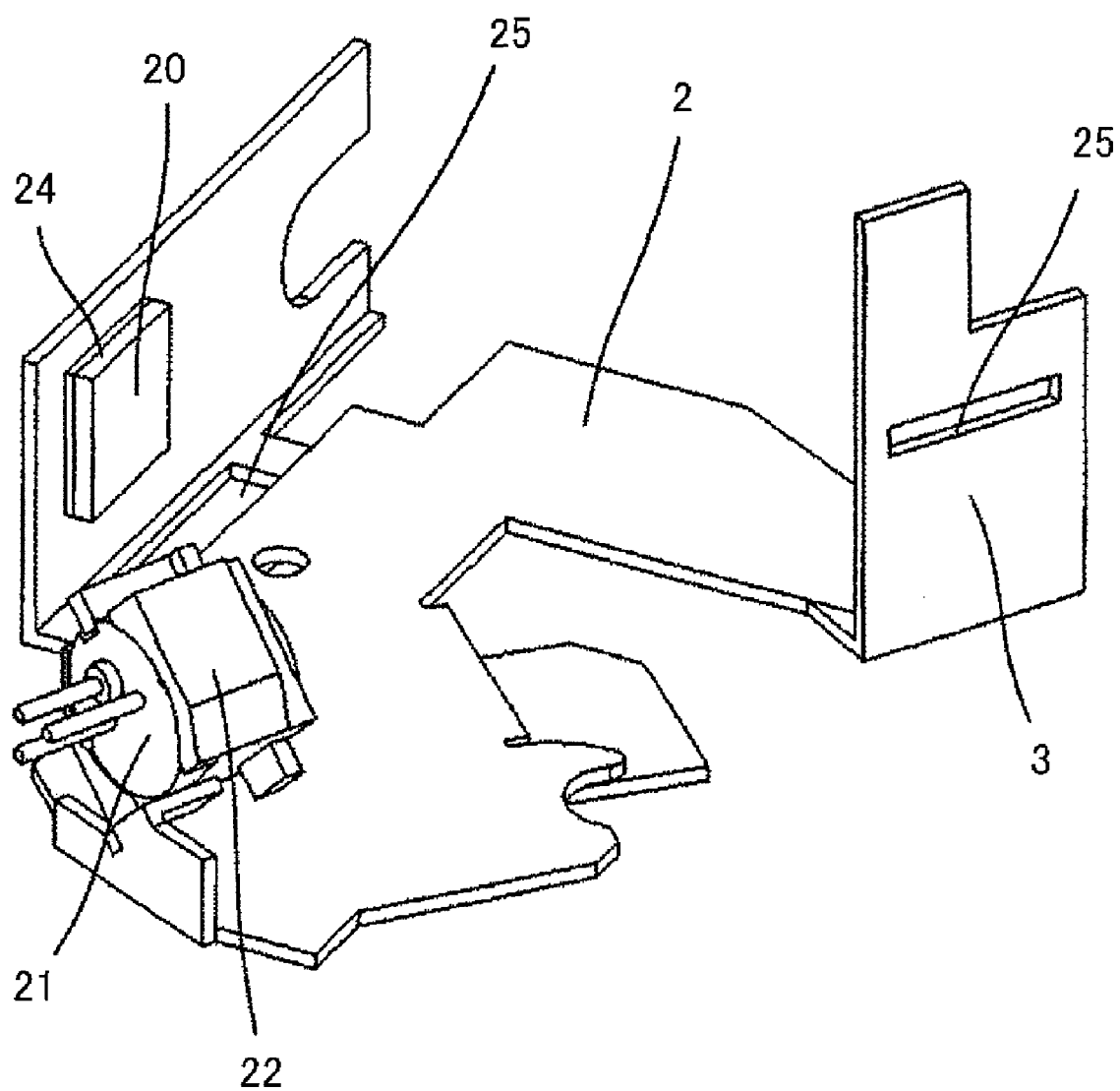
FIG. 8 is a perspective view of the optical pickup equipped with an embodiment 3 according to the present invention.

FIG. 8 is a perspective view of the bottom cover equipped with the present embodiment therein.

In those FIGS. 7 and 8, according the present embodiment, a printed circuit board 5 is disposed on an outer periphery surface of the optical pickup housing 1, and on that is attached a laser driver IC 20. With disposing the laser driver IC 20 at this position and by folding down the bottom cover 2 on the outer periphery side of the optical pickup, as is shown in FIG. 8, it is possible to radiate the heats of the semiconductor laser 21, the objective lens driving mechanism 4 and the laser driver IC 20 by only one (1) member, and thereby reducing the number of the parts thereof. The laser driver IC 20 and the bottom cover 2 are thermally connected through the heat conductive grease 24 put between them.

Embodiment 4

Figure 9:
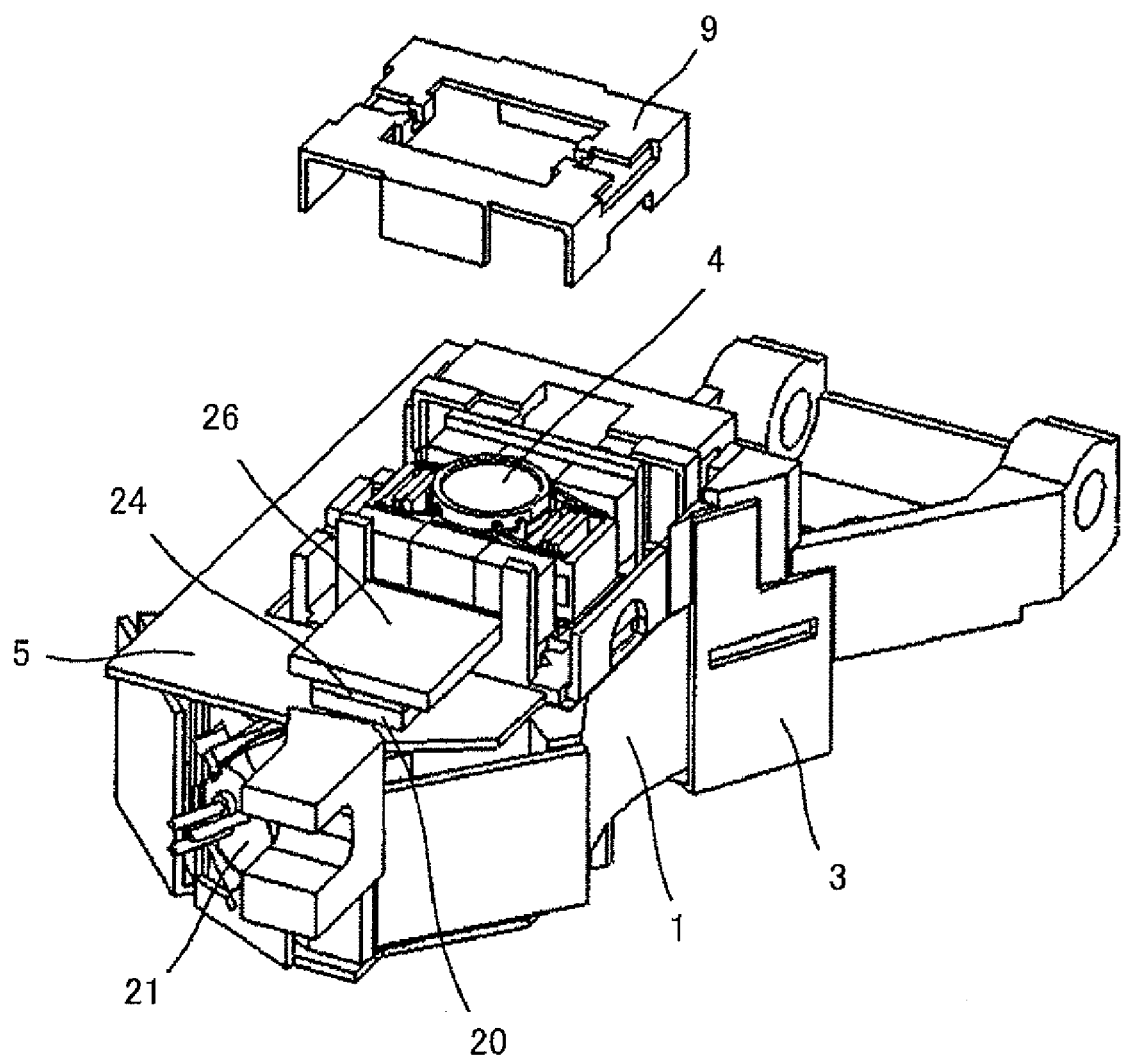
FIG. 9 is a perspective view of the optical pickup equipped with an embodiment 4 according to the present invention.

FIG. 9 is a perspective view of the optical pickup, equipped with an embodiment 4 therein.

In this FIG. 9, the printed circuit board 5 is disposed on the upper side of the optical pickup housing 1, according to the present embodiment, and on the upper surface thereof is attached the laser driver IC 20. With such arrangement of this laser driver IC 20, it is impossible to apply such structures for radiating the heats of the laser driver IC 20, the semiconductor laser 21 and the objective lens driving mechanism 4 by the bottom cover, as is shown by the embodiment 3, simultaneously.

And, with the present embodiment, the magnet supporting metal member 15 of the objective lens driving mechanism 4 (shown in FIG. 4) is extended to a side of the laser driver IC 20, and this extended portion 26 of the magnet supporting metal member and the laser driver IC 20 are thermally connected by the heat conductive grease 24, i.e., using this objecting lens driving mechanism 4 itself as a heat radiator for the laser driver IC 20.

Since the heat radiation performance or capacity of the objective lens driving mechanism 4 is not sufficient, with the conventional structures, transmission of the heat of the laser driver IC 20 into the extended portion 26 of the magnet supporting metal member results into an increase of temperature of the magnet, and therefore it is impossible to apply this. However, since the bent portion 3 of the bottom cover and the objective lens driving mechanism 4 are thermally connected with, it is possible to maintain the sufficient heat radiation performance or capacity for the objective lens driving mechanism 4, and therefore it is possible to obtain the structures of the present embodiment.

As was fully mentioned in the above, according to the present invention, a part of the bottom cover is extended, which is thermally connected with the semiconductor laser and is disposed on a reverse surface of surface of the optical pickup housing facing to the optical disc, to be fold down into the inner periphery side of the optical disc of the optical pickup housing, wherein upon this bent surface is radiated the heat of the semiconductor laser, and with this bent portion thermally connected the objective lens driving mechanism, in particular, with the magnet supporting metal member, and with this it is possible to increase the heat radiation performance or capacity of the objective lens driving mechanism.

Further, within the optical pickup, the optical pickup housing of which is made of resin, it is possible to maintain the heat radiation performance or capacity of the semiconductor laser while keeping the small-size and the light-weight thereof, and also to increase the heat radiation performance or capacity of the objective lens driving mechanism and the semiconductor laser, as well, and thereby enabling to provide the optical pickup having a high reliability thereof.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical pickup, comprising:
   a pickup housing, in which an optical part and a semiconductor laser are fixed, said pickup housing includes an inner periphery surface and an outer periphery surface in relation to an optical disc and is made of resin;
   an objective lens, which is attached within said pickup housing; and
   an objective lens driving mechanism, which is configured to drive said objective lens, further comprising:

a metal-made bottom cover, which covers and holds down a lower surface of said pickup housing and has an extended and folded portion that extends into said inner periphery surface of said pick up housing, wherein said metal-made bottom cover and said semiconductor laser are thermally connected with each other, a magnet supporting metal member, which supports a magnet and is thermally connected to said metal-made bottom cover, a heat conductive grease that is placed between said metal-made bottom cover and said magnet supporting metal member, so as to connect them thermally, wherein the metal-made bottom cover is held down and extended into the inner periphery surface of the optical pickup housing and is elongated, further to an upper side, so as to bring the bottom cover to be close to the objective lens driving mechanism.

2. The optical pickup, as is described in the claim 1, wherein a portion of said bottom cover covering the surface of the inner periphery side of the optical disc of said pickup housing and the magnet supporting metal member of said objective lens driving mechanism are thermally connected with each other.

3. The optical pickup, as is described in the claim 2, wherein an opening is provided on the surface on the inner periphery side of the optical disc of said metal-made bottom cover.

4. The optical pickup, as is described in the claim 2, wherein said semiconductor laser and said objective lens driving mechanism are thermally connected with said metal-made bottom cover.

5. The optical pickup, as is described in the claim 2, wherein a laser driver IC and said objective lens driving mechanism are thermally connected with each other.

6. The optical pickup, as is described in the claim 3, wherein said laser driver IC and said objective lens driving mechanism are thermally connected with each other.

* * * * *